US007028714B2

(12) United States Patent
Lan

(10) Patent No.: US 7,028,714 B2
(45) Date of Patent: Apr. 18, 2006

(54) SERVO HYDRAULIC FLOW CONTROL VALVE ASSEMBLY

(76) Inventor: Tsao-Jung Lan, No. 1, Alley 9, Lane 251, Dongyang Rd., Fengyuan City, Taichung County 420 (TW)

( * ) Notice: Subject to any disclaimer, the term of this patent is extended or adjusted under 35 U.S.C. 154(b) by 0 days.

(21) Appl. No.: 10/847,583

(22) Filed: May 18, 2004

(65) Prior Publication Data

US 2005/0257840 A1 Nov. 24, 2005

(51) Int. Cl.
*F16K 11/22* (2006.01)

(52) U.S. Cl. ........................................ 137/887; 91/452

(58) Field of Classification Search ........... 137/115.13, 137/565.15, 565.16, 565.19, 596.12, 881, 137/887; 91/452

See application file for complete search history.

(56) References Cited

U.S. PATENT DOCUMENTS 4,345,507 A * 8/1982 Simpson et al. .............. 91/449
4,500,069 A * 2/1985 Barber et al. ................. 91/452

* cited by examiner

*Primary Examiner*—Stephen M. Hepperle
(74) *Attorney, Agent, or Firm*—Rosenberg, Klein & Lee

(57) ABSTRACT

A servo hydraulic flow control valve assembly includes an oil distribution board having a first manifold defined therein near an inlet end of the oil distribution board and a second manifold defined in the oil distribution board near an outlet end of the oil distribution board. A relief valve is secured on the oil distribution board, and includes a body positioned on the oil distribution board and a rated control device mounted to the body for selectively opening the first manifold. A servo control device is secured on the oil distribution board. The servo control device includes a controller rotatably received in the oil distribution board and having a passage defined to communicate with the second manifold. A control unit is secured on the oil distribution board for driving the controller to control the pressure and the flow rate in the second manifold.

5 Claims, 6 Drawing Sheets

SERVO HYDRAULIC FLOW CONTROL VALVE ASSEMBLY

BACKGROUND OF THE INVENTION

1. Field of the Invention

The present invention relates to flow control valve assembly, and more particularly to a servo hydraulic flow control valve assembly.

2. Description of Related Art

A conventional hydraulic flow control valve in accordance with the prior art usually uses the rated relief valve to control the pressure. However, the conventional hydraulic flow control valve has some disadvantages that need to be solved.

1. It is inconvenient. The rated relief valve is operated only when the pressure of the system exceeds the rated pressure. Consequently, the conventional relief valve lacks a fine turning capability and is unsuitable for some precise machine.

2. The conventional hydraulic flow control valve low in safety. The pressure of the conventional hydraulic flow control valve is highly rated. Consequently, the high pressure may damage the system and cause a leak of the fluid when the rated pressure is too high.

An automatic grinding machine, with a changeable hydraulic pressure, has a work pressure that is changed relative to the processes of grinding work piece. However, the machine with a changeable hydraulic pressure cannot release pressure in time when the system pressure exceeds the rated pressure because the conventional control valve only controls the pressure in the inlet. Consequently, the buffer margin of the machine is reduced.

The present invention has arisen to mitigate and/or obviate the disadvantages of the conventional hydraulic flow control valve.

SUMMARY OF THE INVENTION

The main objective of the present invention is to provide an improved hydraulic flow control valve assembly that is a servo hydraulic flow control valve assembly.

To achieve the objective, the servo hydraulic flow control valve assembly in accordance with the present invention comprises an oil distribution board having a first manifold defined therein near an inlet end of the oil distribution board and a second manifold defined in the oil distribution board near an outlet end of the oil distribution board. A relief valve is secured on the oil distribution board, and includes a body positioned on the oil distribution board and a rated control device mounted to the body for selectively opening the first manifold. A servo control device is secured on the oil distribution board. The servo control device includes a controller rotatably received in the oil distribution board and having a passage defined to communicate with the second manifold. A control unit is secured on the oil distribution board for driving the controller to control the pressure and the flow rate in the second manifold.

Further benefits and advantages of the present invention will become apparent after a careful reading of the detailed description with appropriate reference to the accompanying drawings.

DETAILED DESCRIPTION OF THE INVENTION

Figure 1:
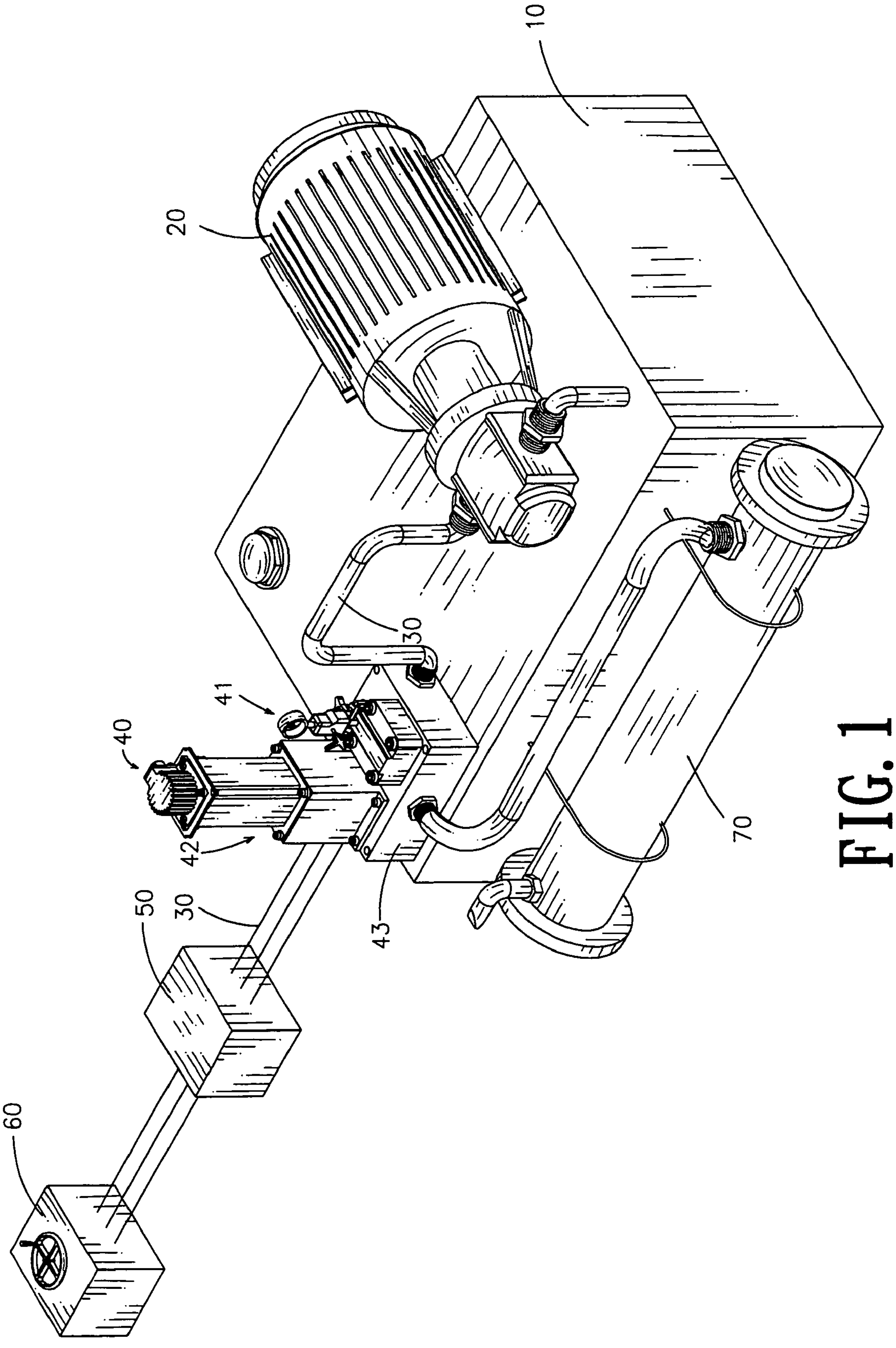
FIG. 1 is a perspective schematic view of a servo hydraulic flow control valve assembly in accordance with the present invention.

Referring to the drawings and initially to FIG. 1, a servo hydraulic flow control valve assembly in accordance with the present invention comprises fluid container (10), a power supplier (20) mounted on the fluid container (10) for sucking the fluid in the fluid container (10), an electric control device (40) mounted on the fluid container (10) and a pipe set (30) provides to sequentially connect the power supplier (20), the electric control device (40), a drive device (50) and a manual plus generator (60).

Figure 2:
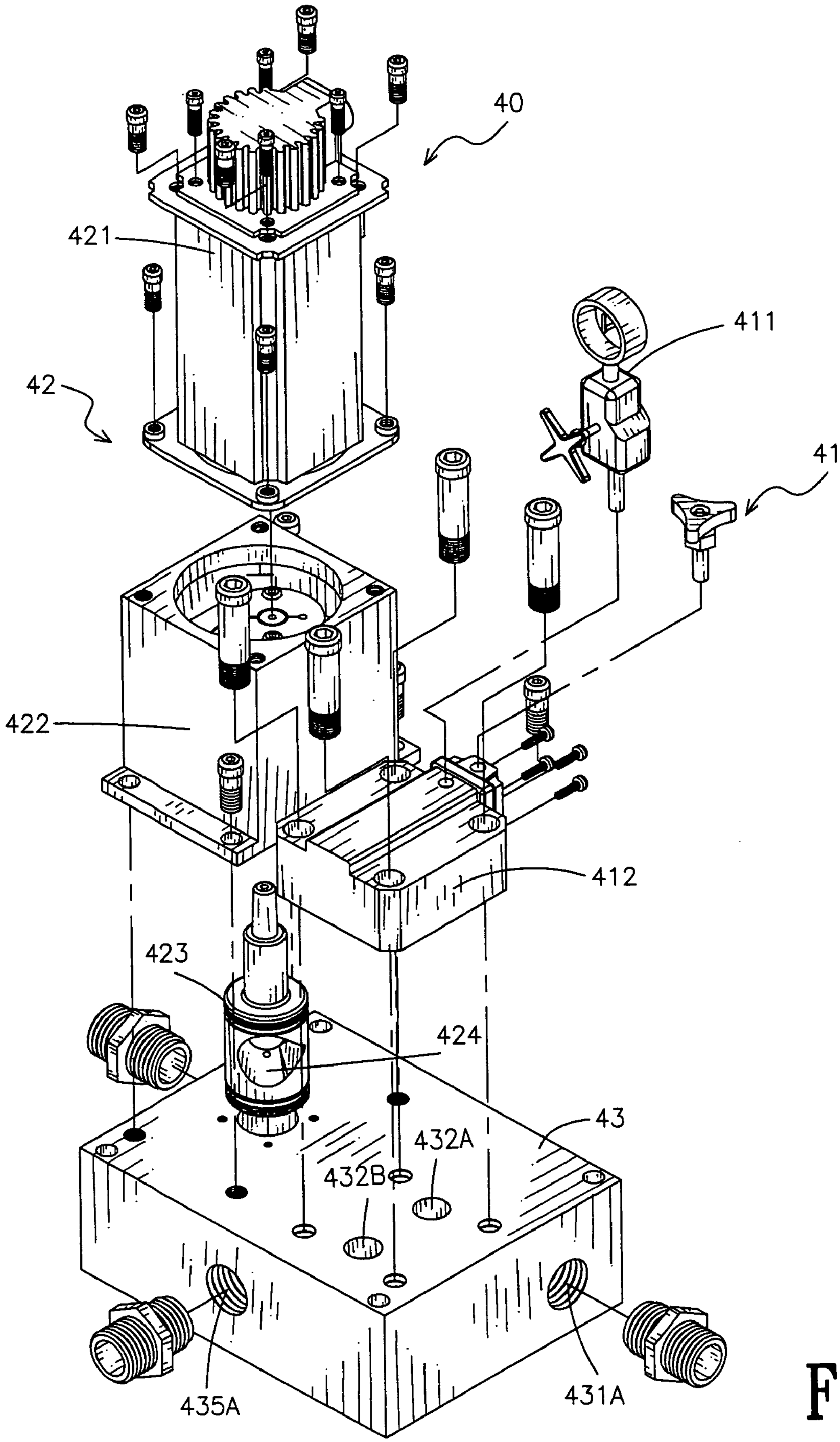
FIG. 2 is an exploded perspective view of an electric control device of the servo hydraulic flow control valve assembly in FIG. 1.

With reference to FIG. 2, the electric control device (40) includes an oil distribution board (43) secured on the fluid container (10), a relief valve (41) and a servo control device (42) respectively secured on the oil distribution board (43). The relief valve (41) includes a body (412) positioned on the oil distribution board (43) and a rated control device (411) mounted to the body (412) of the relief valve (41). The servo control device (42) includes a control unit (422) secured on the oil distribution board (43) and a servomotor (421) mounted on the control unit (422). A controller (423) is partially pivotally received in the oil distribution board (43), extends into the control unit (422) and is connected to the servomotor (421). Consequently, the servomotor (421) can rotate the controller (423). The controller (423) includes a passage (424) defined therein and diametrically extending through the controller (423).

Figure 3:
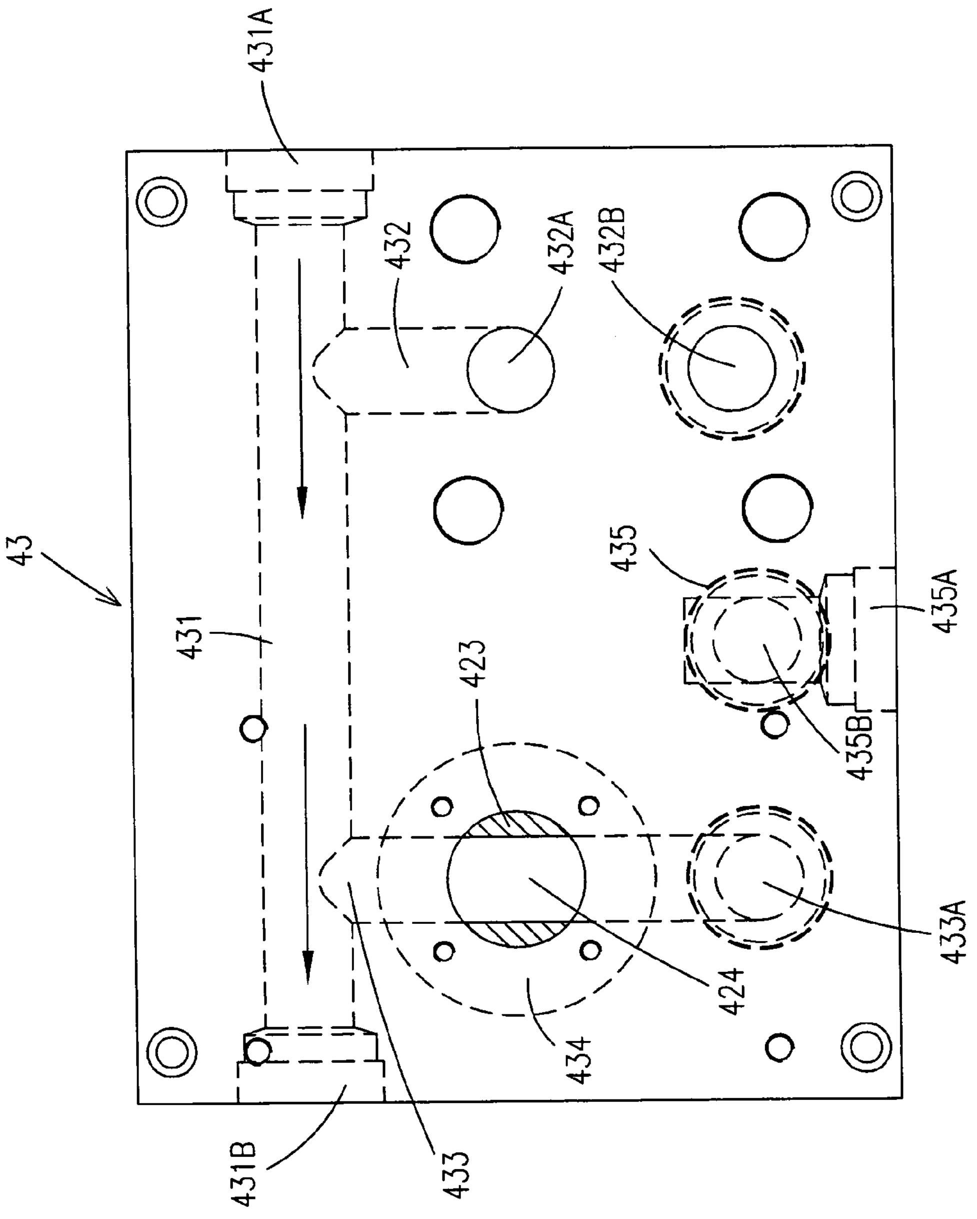
FIG. 3 is a top plan view of a fluid distribution board of the electric control device in FIG. 3 for showing the paths therein.

With reference to FIG. 3, the oil distribution board (43) includes a main passage (431) defined therein and extending through the oil distribution board (43) to respectively form an inlet (431A) and an outlet (431B) in a first side and a second side of the oil distribution board (43). The fluid can flow into the drive device (50) via the main passage (431) and the pipe set (30). A first manifold (432) is defined in the oil distribution board (43) near the first side of the oil distribution board (43), and includes a first end communicating with the main passage (431) and a second end defining a relief inlet (432A) is a top of the oil distribution board (43). The relief inlet (432A) communicates with a first end the relief valve (41). A relief outlet (432B) is defined in the oil distribution board (43). The relief outlet (432B) communicates with a second end of the relief valve (41) and the fluid container (10). A chamber (434) is defined in the oil distribution board (43) for pivotally and partially receiving the controller (423). A second manifold (433) is defined in the oil distribution board (43) near the second side of the distribution board (43). The second manifold (433) centrally extends through the chamber (434) and the controller (423), and has a first end communicating with the main passage (431) and a second end defining a fine turning opening (433A) that communicates with the fluid container (10).

A third manifold (435) is defined in the oil distribution board (43) and corresponds to the cooling device (70). The third manifold (435) has a first end defining a backflow inlet (435A) communicating with the cooling device (70) and a second end defining a backflow outlet (435B) communicating with the fluid container (10).

The rated control device (411) opens the pipe set (30) and the fluid in the system flows back to the fluid container (10) via the relief inlet (432A), the body (412) and the relief outlet (432B) for releasing the pressure in the system when the pressure in the system over the rated pressure of the relief valve (41). The fluid in the system flows through the passage (424) in the controller (423) of the servo control device (42) via the second manifold (433) and achieve the purpose of fine turning when rotating the controller (423), thereby the fluid flows back to the fluid container (10) via the fine turning opening (433A) in the second manifold (433). The fluid is cooled in the cooling device (70) and flows back to the fluid container (10) via the reverse inlet (435A) and the reverse outlet (435B) of the third manifold (435) to form a closed circuit.

Figure 4:
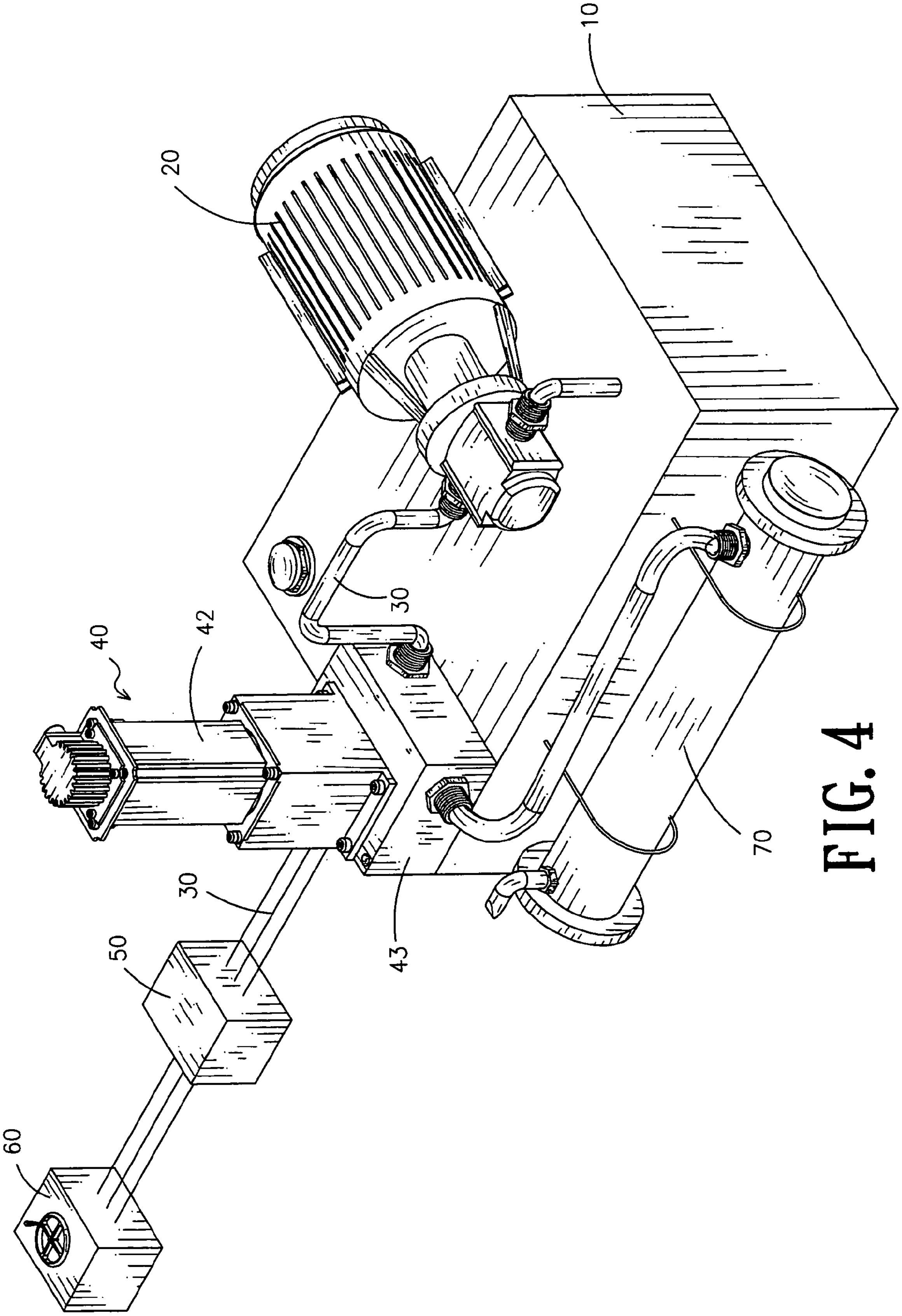
FIG. 4 is a perspective schematic view of a second embodiment of the servo hydraulic flow control valve assembly in accordance with the present invention.
Figure 5:
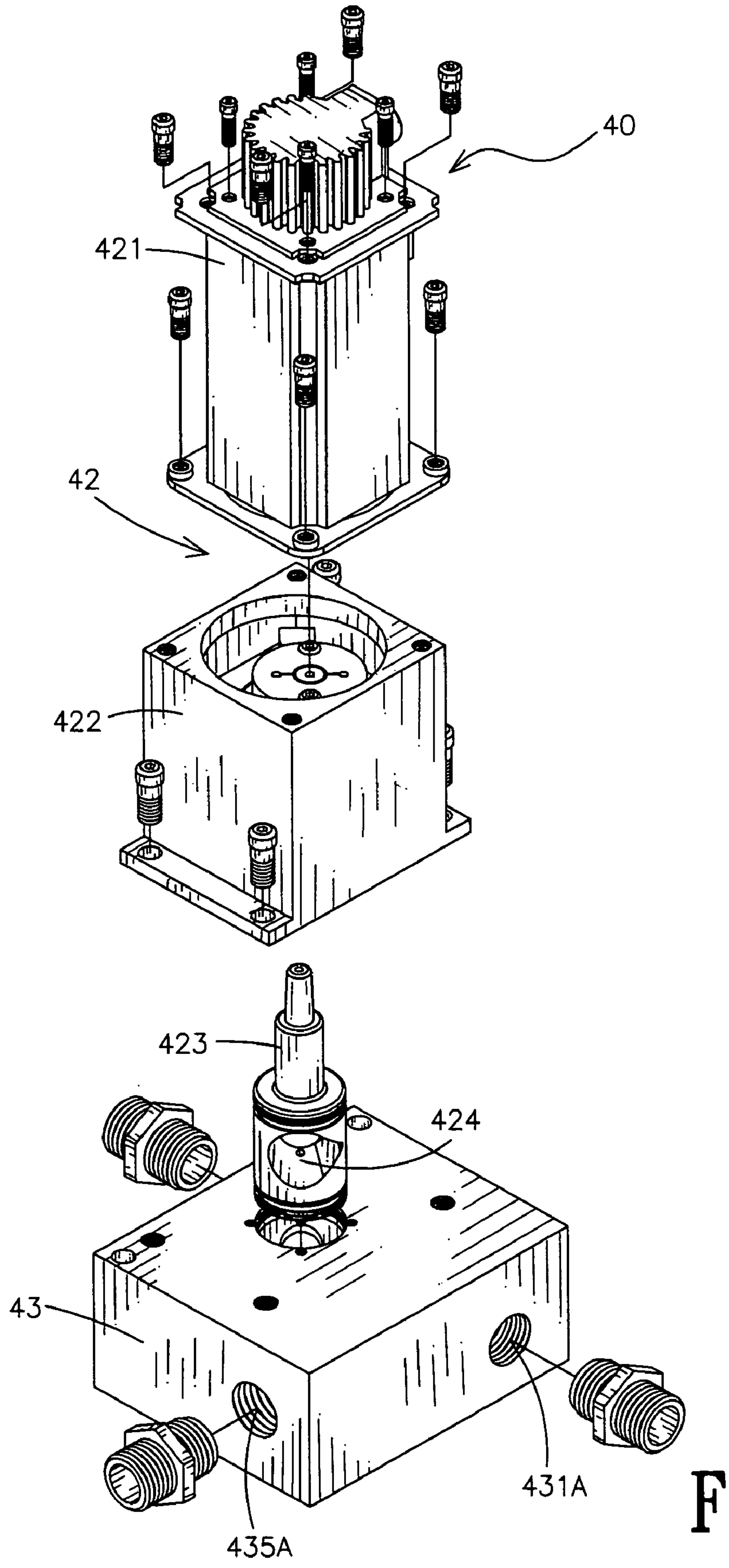
FIG. 5 is an exploded perspective view of an electric control device of the servo hydraulic flow control valve in FIG. 4.
Figure 6:
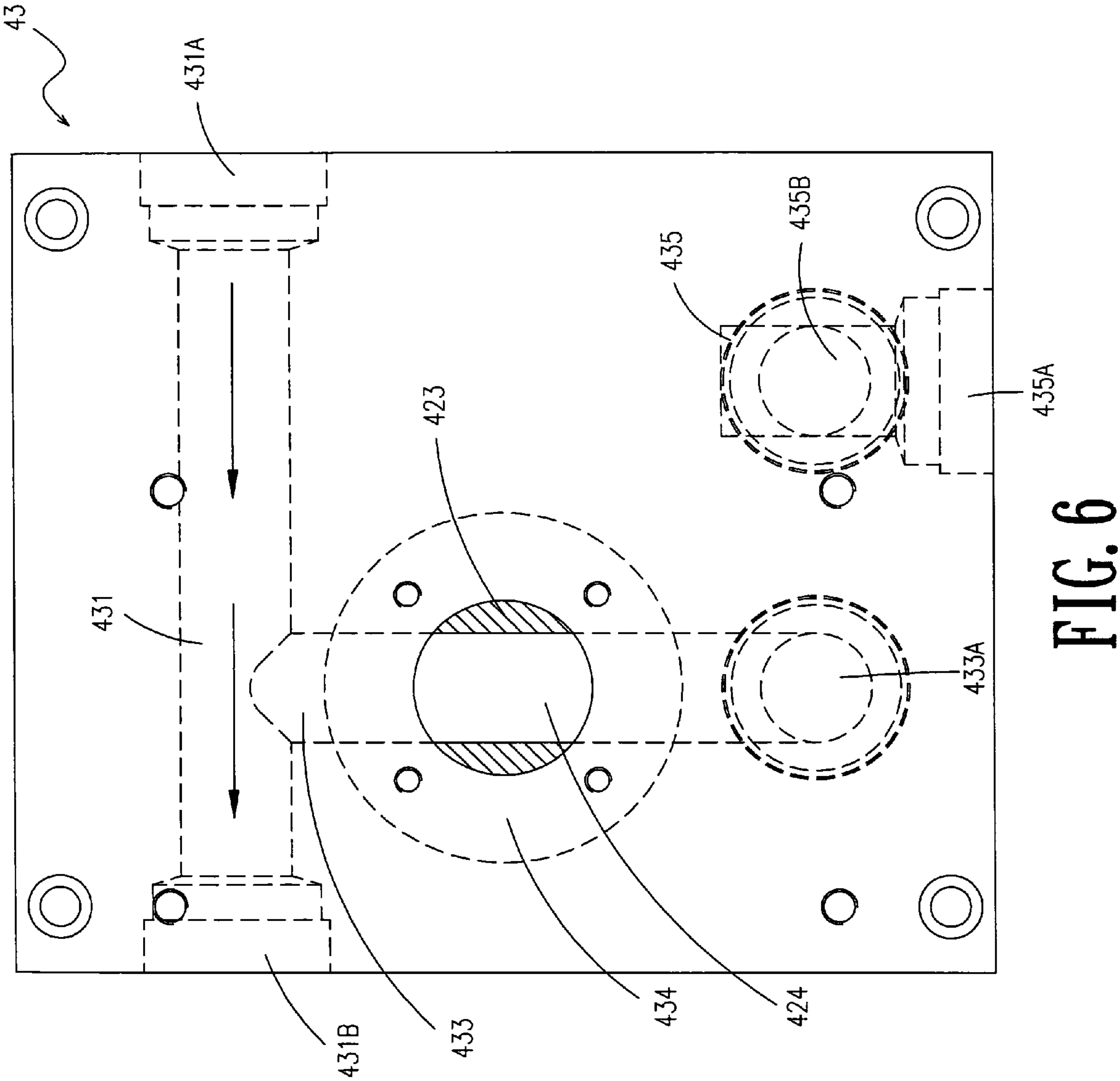
FIG. 6 is a top plan view of a fluid distribution board of the electric control device in FIG. 5, in which shows the paths therein.

With reference to FIGS. 4–6, the relief valve is not absolutely necessary to the present invention. The electric control device (40) can only includes the servo control device (42) and first manifold (432) is unnecessary to the second embodiment of the present invention.

As described above, the servo hydraulic flow control valve assembly in accordance with the present invention comprises the following advantages.

1. The convenience of the servo hydraulic flow control valve assembly is promoted. The servomotor (421) of the servo control device (42) can rotate the controller (423) to control the flow rate and the flow rate in the second manifold (433). As a result, the pressure in the main passage (431) is controlled. Consequently, the servo hydraulic flow control valve assembly of the present invention can be widely used in different field.

2. The relief valve (41) can provide an extra safety to the servo hydraulic flow control valve assembly because the relief valve (41) can quickly relief the pressure in the system.

3. The servo control device (42) can immediately slightly adjust the flow rate and the pressure in the system such that the system can quickly react when the flow rate and the pressure in the system us changed.

4. The buffer margin is raised. The servo control device (42) is used to slightly relieve the pressure in the system such that the buffer margin is raised when the inputted pressure is greater than necessity.

Although the invention has been explained in relation to its preferred embodiment, it is to be understood that many other possible modifications and variations can be made without departing from the spirit and scope of the invention as hereinafter claimed.

What is claimed is:

1. A servo hydraulic flow control valve assembly comprising:

an oil distribution board having inlet and outlet ends disposed in open communication through a main passage extending therebetween, the oil distribution board including a first manifold defined to branch from the main passage near the inlet end of the oil distribution board and a second manifold defined to branch from the main passage near the outlet end of the oil distribution board;

a relief valve secured on the oil distribution board, the relief valve including a body positioned on the oil distribution board and a rated control device mounted to the body for selectively opening the first manifold; and a servo control device secured on the oil distribution board, the servo control device including a controller rotatably received in the oil distribution board to extend transversely across the second manifold, the controller having a transaxial passage defined to communicate with the second manifold when selectively aligned therewith, and a control unit secured on the oil distribution board for driving the controller to control the pressure and the flow rate in the second manifold.

2. The servo hydraulic flow control valve assembly as claimed in claim 1, wherein the main passage communicates respectively with the first manifold and the second manifold, the first manifold has one end communicating with a first end of the relief valve and a second end of the relief valve adapted to communicate with a fluid container, a groove is defined in the oil distribution board communicating with the second manifold for rotatably receiving the controller, the second manifold having one end adapted to communicate with the fluid container.

3. A servo hydraulic flow control valve assembly comprising:

an oil distribution board having inlet and outlet ends disposed in open communication through a main passage extending therebetween, the oil distribution board including a first manifold defined to branch from the main passage near the inlet end of the oil distribution board and a second manifold defined to branch from the main passage near the outlet end of the oil distribution board;

a relief valve secured on the oil distribution board, the relief valve including a body positioned on the oil distribution board and a rated control device mounted to the body for selectively opening the first manifold; and a servo control device secured on the oil distribution board, the servo control device including a controller rotatably received in the oil distribution board to extend transversely across the second manifold, the controller having a transaxial passage defined to communicate with the second manifold when selectively aligned therewith, and a servo motor driven control unit secured on the oil distribution board for driving the controller to control the pressure and the flow rate in the second manifold.

4. The servo hydraulic flow control valve assembly as claimed in claim 3, wherein the main passage communicates respectively with the first manifold and the second manifold, the first manifold has one end communicating with a first end of the relief valve and a second end of the relief valve adapted to communicate with a fluid container, a groove is defined in the oil distribution board communicating with the second manifold for rotatably receiving the controller, the second manifold having one end adapted to communicate with the fluid container.

5. A servo hydraulic flow control valve assembly comprising:

an oil distribution board having inlet and outlet ends disposed in open communication through a main passage extending therebetween, the oil distribution board including at least one pressure relief manifold defined to branch intermediately from the main passage to a pressure releasing opening formed through an outer surface of the oil distribution board; and a servo control device secured on the oil distribution board, the servo control device including a controller rotatably inserted into the oil distribution board to extend transversely across an intermediate portion of the pressure relief manifold;

the controller being angularly displaceable relative to the pressure relief manifold, the controller being formed with a transaxial passage defined to communicate with the pressure relief manifold when selectively aligned therewith, and a control unit secured on the oil distribution board for selectively driving the angular displacement of the controller to control the pressure and the flow rate in the pressure relief manifold.

* * * * *